July 24, 1956

R. W. SAMSEL 2,756,353

BENDER-MODE PIEZOELECTRIC DEVICE
AND METHOD OF MAKING THE SAME

Filed April 10, 1950

Inventor:
Richard W. Samsel,
by Paul A. Frank
His Attorney.

United States Patent Office 2,756,353

Patented July 24, 1956

2,756,353

BENDER-MODE PIEZOELECTRIC DEVICE AND METHOD OF MAKING THE SAME

Richard W. Samsel, Schenectady, N. Y., assignor to General Electric Company, a corporation of New York Application April 10, 1950, Serial No. 154,957

17 Claims. (Cl. 310—8.0)

Figure 1:
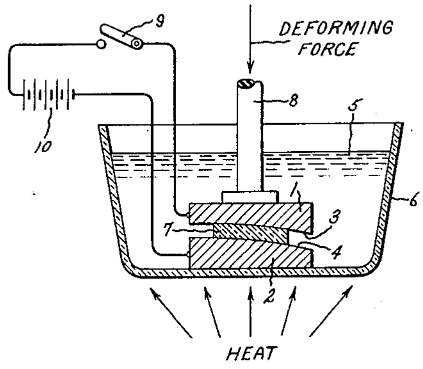

My invention relates to piezoelectric devices and, more particularly, to methods for producing bender type piezoelectric units and to transducer devices utilizing such piezoelectric units.

It has been discovered that certain polycrystalline ceramic materials, particularly those ceramics of the alkaline earth metal titanates and alkaline earth metal zirconates, may be sensitized to exhibit piezoelectric properties by the application of a strong polarizing electrical field through the ceramic for an appreciable length of time. These polarized ceramics are known to possess properties which are analogous to the piezoelectric properties inherent in quartz crystals when a voltage is applied across the various dimensions of the ceramic. The resultant commonly utilized modes of motion are the longitudinal length mode, the radial mode, the longitudinal thickness mode and the shear mode. Whether these induced electricity-to-mechanical force translating properties are the result of a true piezoelectric effect or due to an electro-strictive effect in the ceramic is still somewhat in doubt. However, these properties are customarily referred to as "piezoelectric" and will be so defined in this application. There has recently been considerable literature published on the properties of these activated ceramics and an excellent discussion of both the properties and theory of activation of the sensitized ceramics can be found in a paper by W. P. Mason entitled "Electro-strictive effect in barium titanate ceramics," published in the Physical Review, volume 74, No. 9, November 1948, pages 1134–1147.

Many industrial applications of piezoelectric transducing devices such as in phonograph pickups or microphones require that the device have both a high mechanical compliance, i. e., a high ratio of deformation to force, and a low electrical impedance. In order to accomplish this, two thin crystals are commonly cemented together so that one will operate in tension and the other in compression when the combination is bent or twisted. Conversely, the crystals are so cut and assembled that, upon application of a signal voltage, one of the crystals contracts while the other crystal expands, with the result that a bending action of the entire unit, similar to that of a bimetallic thermostat, results. This combination of crystals is known as a "bender" or "twister" "bimorph," depending upon whether the application of a voltage causes the bimorph to bend along only one major dimension (bender) or to bend simultaneously along both major dimensions so as to twist. The construction and operation of such bimorphs is fully disclosed in U. S. Patent 2,451,966, issued to Frank Massa on October 19, 1948. This same bimorph technique has also been applied to produce bender piezoelectric type units from piezoelectrically sensitizable ceramics.

I have discovered, however, that a single piece of ceramic of the type capable of being sensitized to exhibit piezoelectric properties may be activated, by a method hereinafter disclosed, to have "bender mode" piezoelectric properties; in other words, to produce an electrical voltage between opposing faces of the ceramic which varies in accord with the extent of bending or twisting, and conversely to produce a predetermined mechanical bending or twisting deformation of the ceramic which varies in accord with the amplitude of a signal voltage applied to electrodes in intimate contact with a pair of opposing faces thereof. Piezoelectrically sensitizable ceramics activated according to the latter method and having such bender mode piezoelectric properties will hereinafter be referred to as "bender type ceramic piezoelectric units" regardless of whether a bending or twisting deformation is to be produced. It will be appreciated that transducers employing such single piece bender type ceramic piezoelectric units are much simpler of construction and consequently much less expensive than the conventional bimorph-type transducers.

A principal object of my invention, therefore, is to provide a method of activating a single piece of piezoelectrically sensitizable ceramic material to produce a bender type electro-mechanical unit.

Another object is to provide a method of preparing such activated bender type ceramic piezoelectric units for use in bender type transducers.

A further object of my invention is to provide an improved bender type transducer device suitable for use in phonograph pickups or microphones which has a simple and economical construction.

In general, my new method comprises subjecting a piece of piezoelectrically sensitizable ceramic material, such as barium titanate ceramic, to a predetermined deforming mechanical force while the ceramic is being sensitized to exhibit piezoelectric properties by the application of a polarizing electrical field across a pair of opposing faces and through the ceramic. After the ceramic has become sensitized, the deforming force is removed and the ceramic thereafter produces a voltage across its electric sensitizing faces whenever it is deformed toward the same configuration as during the activation process.

In order to produce a bender type transducer suitable for phonograph pickups or microphones, the opposing major faces of a thin slab of such bender type piezoelectrically sensitized ceramic are intimately covered with a pair of electrodes or alternatively, the ceramic slab is sensitized after the electrodes have been secured thereto.

There are two general methods of sensitizing ceramic material described in the literature. One method is to apply a very strong electrical field, usually no less than 8 kilovolts per centimeter, through the material at normal room temperature for an extended period of time, such as for several hours. If higher activating voltages are used, a smaller period of time is required to produce the same resultant electro-mechanical coupling co-efficient in the ceramic. The other method is to apply the sensitizing electrical field after the ceramic has been heated above its "Curie temperature" and to cool the ceramic through this Curie point while the electrical field is maintained through the ceramic. Activation by this latter method usually requires considerably less time and a lower intensity field than that required for activation at room temperature.

The "Curie temperature" as herein employed is commonly defined as the temperature point at which the dielectric constant of the particular ceramic is maximum. For pure barium titanate, the Curie temperature is very close to 120° C. and also represents the temperature above which the polycrystalline barium titanate has a cubic structure and below which it has a tetragonal structure.

It will be appreciated that many polycrystalline ceramic materials other than barium titanate have been found to be amenable to piezoelectric sensitization by either of the above-mentioned methods. Ceramics of barium zirconate, barium strontium titanate, and barium calcium titanate, for example, may also be sensitized in this manner; and I have found that any such piezoelectrically sensitizable ceramics may also be activated to form bender type piezoelectric units by my new method.

Figure 2:
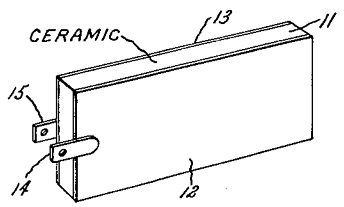
Figure 3:
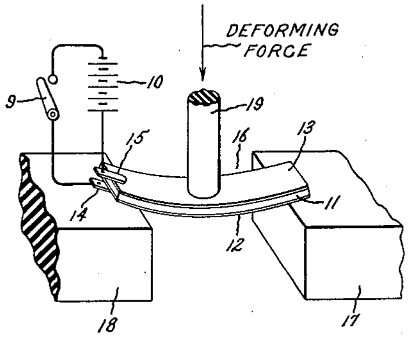
Figure 4:
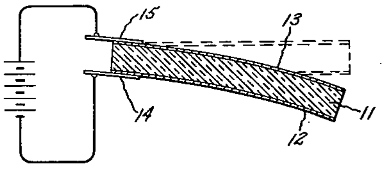
Figure 5:
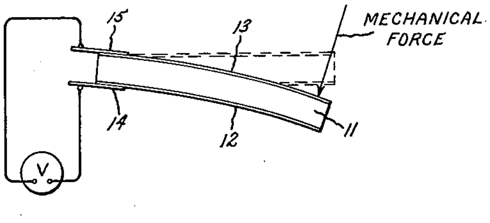

The novel features which I believe to be characteristic of my invention are set forth with particularity in the appended claims. My invention itself, however, together with further objects and advantages thereof can best be understood by reference to the following description taken in connection with accompanying drawings in which Fig. 1 is a diagrammatic sectional view of apparatus useful in the explanation of my new method of bender mode activation of ceramic materials; Fig. 2 is a perspective view of a transducer device constructed from a piece of such bender type piezoelectrically sensitized ceramic; Fig. 3 is a diagrammatic perspective view of apparatus explanatory of an alternative method of activating a piece of ceramic material to exhibit bender type piezoelectric properties; Fig. 4 is a sectional view of a transducer device similar to Fig. 2 illustrating the bender mode of motion upon the application of an electrical voltage to its electrodes and Fig. 5 is a sectional view illustrating the production of an electrical voltage at the terminals of a bender type transducer device similar to that shown in Fig. 2 upon the application of a mechanical deforming force.

Referring to Fig. 1, I have diagrammatically illustrated one apparatus for practicing my new method wherein a pair of electrically conductive pressure plates 1 and 2 having conforming opposing curved surfaces 3 and 4, respectively, are immersed in an insulating oil bath 5 within an electric insulating vat 6. A thin and preferably flat slab 7 of electro-mechanically sensitizable ceramic material such as barium titanate, barium zirconate, barium strontium titanate or barium calcium titanate is placed intermediate the pressure plates 1 and 2 with its opposing major faces substantially parallel to surfaces 3 and 4. Slab 7 is then bent along at least one major dimension to a configuration which matches the curved pressure plate surfaces 3 and 4 by a deforming force parallel to the thickness dimension of slab 7 produced by a downward pressure applied to the upper pressure plate 1 through a pressure rod 8. The term "major dimension" is herein employed to define the length or width dimension of the slab 7 as contrasted with the substantially small thickness dimension of the slab. It is evident, of course, that the opposing surfaces 3 and 4 of pressure plates 1 and 2 may be constructed to have many different and more complex conforming contours than the simple curved surface illustrated in Fig. 1 in order to enable a bending deformation of the ceramic along one major dimension to any desired bent configuration or along both major dimensions simultaneously to any desired twisted configuration. It is also apparent, that the degree of permissive curvature of the surface contour is partially limited by the elastic limit of the ceramic and completely limited by the breaking point of the particular thickness and type of ceramic material employed. I have found, however, that the electro-mechanical coupling coefficient usually increases as the extent of ceramic deformation approaches the breaking point.

The activation process to produce a bender type piezoelectric unit may now be completed by merely polarizing the ceramic material 7 by either of the known sensitizing methods described above while it is maintained under the deforming pressure of plates 1 and 2. The sensitizing electrical field may be produced through the ceramic, for example, by connecting the conductive pressure plate 1 through an energizing switch 9 to one terminal of a source of high electrical potential 10 while connecting the other terminal of the potential source 10 to the pressure plate 2 as shown in Fig. 1. By closing switch 9, a high unidirectional electrical field is established intermediate the opposing faces of the pressure plates 1 and 2 and, of course, passes through the ceramic slab 7 parallel to the thickness dimension thereof. As explained above, the polarizing electric field is preferably no less than 8 kilovolts per centimeter. If both the deforming pressure and the electrical fields are maintained for several hours at normal room temperature, the activation process will be completed. Alternatively, heat may be applied, as indicated in Fig. 1, to raise the temperature of the ceramic slab 7 above its Curie point before the switch 9 is closed to provide the sensitizing field. After the electrical field is applied, the heat is removed and the ceramic slab 7 is allowed to cool through its Curie point while the pressure and the electrical field are maintained. Activation of the ceramic slab by this latter method, as previously explained, may be accomplished with a lower polarizing electrical field than at room temperature and usually within a shorter time. After the ceramic material has cooled sufficiently, the electrical field is removed by opening switch 9, and then the deforming pressure is removed by lifting the pressure rod 8. Due to its inherent elasticity, the activated piece of ceramic material 7 will thereupon return towards its original configuration and will thereafter exhibit piezoelectric properties upon being bent or twisted towards its deformed activation configuration or, conversely, will bend towards this configuration when an electrical field is established through this ceramic in the same direction as the sensitizing electrical field. The extent of such generated voltage depends, of course, upon the extent of bending or twisting, while the extent of mechanical bending conversely depends upon the strength of the established electrical field.

While the physical explanation of the above phenomena is, as yet, only partially understood, the most probable explanation is that the above-described bender mode of activation is produced by a lattice distortion in the individual ceramic crystals or cells caused by mechanical deformation while the ceramic is being sensitized. In barium titanate ceramic, for example, the titanium ion is substantially at the center of the barium hexahedran, and an oxygen ion is located in the center of each of the six sides of the cube. The titanium atom vibrates in conjunction with the various oxygen atoms, sharing electrons with them; and above 120° C., the Curie temperature, titanium ion moves around the center of the cube in random fashion. Below this temperature, and including normal room temperature, the titanium atom vibrates in conjunction with a particular neighboring oxygen atom, and groups of neighboring cells are found to oscillate or vibrate, with the center of oscillation of each of the titanium ions in a particular group or "domain" shifted toward a similarly positioned oxygen atom. By the application of a polarizing electrical field, the shifting of these centers of oscillation can be controlled to cause an orientation of all of the domains in the same general direction; and the extent of such orientation is a direct measure of the degree of electro-mechanical properties produced. Since, in the above-described bender mode activation process, the ceramic has a particular deformed configuration during the orientation of the individual ceramic cells, increasing voltage is developed across the activated ceramic whenever it is bent toward this activation configuration.

Referring now to Fig. 2, I have shown one embodiment of a transducer which is suitable for use in phonograph pickups or microphones and constructed from a bender type ceramic piezoelectric unit, such as described above. A thin elongated slab of ceramic material 11 is employed which has been activated to exhibit a transverse bending mode along its longitudinal axis by the simultaneous application of a transverse deforming mechanical force and a transverse activating electrical field applied through the ceramic slab from one major face to the other. These opposing major faces are then covered by thin flexible highly conductive electrodes 12 and 13 which are secured in intimate contact with the ceramic. These electrodes 12 and 13 are preferably film-like such as in the form of a thin silver foil secured to the faces of the ceramic material by a suitable conductive cementitious material. Each of these electrodes are supplied with a signal terminal 14 and 15, respectively, which has previously been soldered to the foil. Upon the application of a voltage to the terminals 14 and 15, the entire unit bends in the direction of the activation deformation, as illustrated by Fig. 4, or conversely, as illustrated in Fig. 5, a voltage appears across the terminals 14 and 15 upon the exertion of a mechanical deforming force in the same direction.

It will be appreciated that if the ceramic slab has been activated before the application of the electrodes 12 and 13, any further application of heat to the ceramic, in securing the electrodes to the ceramic, which raises the temperature of the ceramic above its Curie point for any appreciable length of time will cause the deactivation of the ceramic material. I, therefore, have found, as illustrated in Fig. 3, that the bender mode activation of a ceramic slab may also be accomplished quite easily after the electrodes have been secured to the opposing faces of the ceramic material by merely applying the polarizing electric field to these prepared electrodes while the ceramic is maintained under a deforming mechanical stress. This latter alternative method of bender mode activation permits the electrodes 12 and 13 to take the form of a silver coating bonded to the ceramic. A coating compound including a silver paste, ground glass, and an organic binder is spread upon the ceramic faces and becomes securely bonded to the ceramic when heated to a temperature of several hundred degrees centigrade. Other known coating methods which require heat, such as direct soldering or sputtering may also, of course, be employed; and the terminals 14 and 15 may be soldered to the electrodes 12, 13 after the electrodes have been bonded to the ceramic.

Referring to Fig. 3, I have diagrammatically illustrated an apparatus for activating a completely constructed transducer 16 similar to that described in connection with Fig. 2. The transducer 16 is merely supported in a suitable fashion, such as by the insulating supports 17 and 18, and a mechanically deforming force, diagrammatically illustrated by a weight 19, is applied to the ceramic in a direction substantially parallel to the thickness dimension of slab 11 so as to apply a suitable bending moment to the ceramic material. A sensitizing electrical field is produced through the ceramic by merely connecting a high electrical potential across the terminals 14 and 15, as illustrated. In order to minimize the danger of arcing, the entire apparatus may be immersed in an insulating oil bath, and in order to hasten the actitvation process, the ceramic may be cooled through its Curie temperature while it is being sensitized, as explained hereinbefore.

Although I have described particular apparatus for carrying my new bender mode activation process of ceramic into effect, it is to be understood that such apparatus is described by way of illustration only and is not to be considered to limit this new method to any particular apparatus shown. It is also to be understood that although I have provided a particular transducer embodiment of my invention, many modifications of this transducer may be made and I, therefore, intend by the appended claims to cover all such modifications as fall within the true spirit and scope of my invention.

What I claim as new and desire to secure by Letters Patent of the United States is:

1. The method of producing a bender type piezoelectric transducer which comprises, coating each of the opposing major surfaces of a thin slab of piezoelectrically sensitizable ceramic material with a layer of conductive metal to form a pair of opposing electrodes on the slab, bending the slab to an extent less than its elastic limit along a major dimension thereof, and piezoelectrically sensitizing the slab by applying a polarizing electrical potential between the pair of electrodes while the slab is maintained in said bent state.

2. The method of producing a bender type piezoelectric transducer which method comprises coating each of the opposing major surfaces of a thin slab of ceramic material comprising principally barium titanate with a thin flexible layer of conductive metal to form a pair of opposing electrodes on the slab, bending the slab to an extent less than its elastic limit along a major dimension thereof, heating the slab above its Curie temperature, and piezoelectrically sensitizing the slab by applying a polarizing electric potential between the pair of electrodes and gradually cooling the slab through its Curie temperature while both the bending and the electric potential are maintained.

3. A bender type transducer comprising a piezoelectric unit consisting of a thin flat slab of barium titanate ceramic having bender mode piezoelectric properties whereby said unit develops a voltage between opposite major surfaces when a bending moment is applied thereto and bends when a voltage is applied between said opposite major surfaces, and a pair of flexible electrodes each covering a respective one of the pair of opposing major surfaces of said slab and in electrically conductive contact therewith.

4. The method of producing bender mode activation of a single slab of polycrystalline ceramic material of the type which may be electrically polarized to exhibit piezoelectric properties, the slab having major dimensions greater than its thickness dimension, which method comprises bending the slab along at least one major dimension thereof, and polarizing the slab in a direction parallel to the thickness dimension thereof while the slab is maintained in the bent condition.

5. The method of activating a single slab of polycrystalline ceramic comprising principally barium titanate to exhibit bender type piezoelectric properties, the slab having at least one major dimension greater than its thickness, which method comprises bending the slab along the major dimension by applying a temporarily deforming force parallel to the thickness dimension thereof, and applying a polarizing electric field through the slab in a direction substantially parallel to the direction of the deforming force while the slab is being maintained in the bent state by the deforming force.

6. The method of activating a single thin slab of barium titanate ceramic to exhibit bender type piezoelectric properties, which method comprises bending the slab along a major dimension thereof by an amount less than the elastic limit of the slab and applying a unidirectional electric field of not less than 8 kilovolts per centimeter through the slab in a direction substantially parallel to the thickness dimension thereof while the slab is maintained in the bent condition.

7. The method of activating a single thin slab of barium titanate ceramic to exhibit bender type piezoelectric properties, which method comprises bending the slab along at least one major dimension thereof, heating the slab above its Curie temperature, and piezoelectrically sensitizing the slab by applying a strong unidirectional field through the slab in a direction substantially parallel to the thicknesss dimension thereof, and gradually cooling the slab through its Curie temperature while both the bending and the electric field are maintained.

8. A bender type transducer consisting of a thin flat slab of barium titanate ceramic, and a pair of flexible electrodes each covering a respective one of the pair of opposing major surfaces of said slab and in electrically conductive contact therewith, said slab having the bender mode piezoelectric property of developing a voltage between said electrodes when the slab is bent by a bending moment produced by a component of force applied thereto in a direction parallel to its thickness dimension.

9. A piezoelectric transducer consisting of a single flat slab of piezoelectrically sensitizable ceramic material having at least one dimension greater than its thickness dimension, and a pair of metallic electrodes each covering and in electrically conductive contact with a respective one of the pair of opposing major surfaces of said slab extending in planes perpendicular to its thickness dimension, said slab having the bender mode piezoelectric property of bending along said one dimension when a voltage is supplied between said electrodes.

10. A bender type transducer comprising a piezoelectric unit consisting of a single thin slab of ceramic material comprising principally barium titanate having bender mode piezoelectric properties, said ceramic slab having each of a pair of its opposing major surfaces coated with a film-like layer of electrically conductive metal constituting an electrode of said transducer, said bender mode piezoelectric properties existing in the material between said opposing major surfaces.

11. A piezoelectric unit comprising a single homogeneous block of piezoelectrically sensitizable ceramic material having two opposed surfaces, a pair of electrodes adjacent said opposed surfaces having said material therebetween, said material between said electrodes having bender mode piezoelectric properties whereby electromotive force appears between said electrodes when the material between said electrodes is subjected to a bending moment and said block bends between said electrodes when electromotive force is applied between said electrodes.

12. A piezoelectric unit comprising a thin block of homogeneous piezoelectric sensitizable ceramic material having two oposed surfaces each having major width and length dimensions, said surfaces being separated by the minor thickness dimension of said block of material, a pair of electrically conducting electrodes adjacent said surfaces having said material therebetween, said material between said electrodes having bender mode piezoelectric properties whereby when voltage is applied between said electrodes said block bends and when said block is subjected to a bending moment a voltage between said electrodes is generated by said material.

13. A piezoelectric unit comprising a slab of polycrystalline ceramic material of the type which may be electrically polarized to exhibit bender mode piezoelectric properties, the slab having major dimensions greater than its thickness dimension, said slab of ceramic material having been polarized to exhibit bender mode piezoelectric properties by the method which comprises bending the slab along at least one major dimension thereof, and polarizing the slab in a direction substantially parallel to the thickness dimension thereof while the slab is maintained in the bent condition.

14. A piezoelectric unit comprising a slab of polycrystalline ceramic comprising principally barium titanate, the slab having at least one major dimension greater than its thickness, said slab having been polarized to exhibit bender mode piezoelectric properties by the method which comprises bending the slab along the major dimension by applying a temporarily deforming force parallel to the thickness dimension thereof, and applying a polarizing electric field through the slab in a direction substantially parallel to the direction of the deforming force while the slab is being maintained in the bent state by the deforming force.

15. A piezoelectric unit comprising a slab of polycrystalline ceramic material of the type which may be electrically polarized to exhibit piezoelectric properties, the slab having major dimensions greater than its thickness dimension, said slab having been polarized to exhibit bender mode piezoelectric properties by the method which comprises bending the slab along at least one major dimension thereof, heating the slab above its Curie temperature, and piezoelectrically sensitizing the slab by applying a strong unidirectional field through the slab in a direction substantially parallel to the thickness dimension thereof and gradually cooling the slab through its Curie temperature while both the bending and the electric field are maintained.

16. A bender type transducer comprising a piezoelectric unit consisting of a thin slab of polycrystalline ceramic material of the type which may be electrically polarized to exhibit bender mode piezoelectric properties, said ceramic slab having each of a pair of its opposing major surfaces coated with a film-like layer of electrically conductive metal constituting an electrode of said transducer, said thin slab of ceramic material having been polarized by the method which comprises bending the slab to an extent less than its elastic limit along a major dimension thereof, and piezoelectrically sensitizing the slab by applying a polarizing electrical potential between the pair of electrodes while the slab is maintained in said bent state.

17. A bender type transducer comprising a piezoelectric unit consisting of a thin slab of polycrystalline ceramic material of the type which may be electrically polarized to exhibit bender mode piezoelectric properties, said ceramic slab having each of a pair of its opposing major surfaces coated with a film-like layer of electrically conductive metal constituting an electrode of said transducer, said thin slab of ceramic material having been polarized by the method which comprises bending the slab to an extent less than its elastic limit along a major dimension thereof, heating the slab above its Curie temperature, and piezoelectrically sensitizing the slab by applying a polarizing electric potential between the pair of electrodes and gradually cooling the slab through its Curie temperature while both the bending and the electric potential are maintained.

References Cited in the file of this patent

UNITED STATES PATENTS

| | | |
|---|---|---|
| 2,484,950 | Jaffe | Oct. 18, 1949 |
| 2,486,560 | Gray | Nov. 1, 1949 |
| 2,515,446 | Gravley | July 18, 1950 |
| 2,538,554 | Cherry | Jan. 16, 1951 |
| 2,540,187 | Cherry | Feb. 6, 1951 |
| 2,624,853 | Page | Jan. 6, 1953 |
| 2,659,829 | Baerwald | Nov. 17, 1953 |

OTHER REFERENCES

Mellor: "Comprehensive Treatise on Inorganic and Theoretical Chemistry," vol. 7, page 136.